United States Patent
Geib

(10) Patent No.: US 10,233,106 B2
(45) Date of Patent: Mar. 19, 2019

(54) MELTING FURNACE HAVING INFINITE FURNACE CAMPAIGN

(71) Applicant: Uwe Geib, Penzberg (DE)

(72) Inventor: Uwe Geib, Penzberg (DE)

( * ) Notice: Subject to any disclaimer, the term of this patent is extended or adjusted under 35 U.S.C. 154(b) by 0 days.

(21) Appl. No.: 14/603,243

(22) Filed: Jan. 22, 2015

(65) Prior Publication Data
US 2015/0259233 A1     Sep. 17, 2015

Related U.S. Application Data

(63) Continuation of application No. 13/123,120, filed as application No. PCT/EP2009/007101 on Oct. 5, 2009, now abandoned.

(30) Foreign Application Priority Data

Oct. 8, 2008  (DE) .................. 10 2008 050 855

(51) Int. Cl.
*F27D 1/00* (2006.01)
*C03B 5/24* (2006.01)
(Continued)

(52) U.S. Cl.
CPC ............... *C03B 5/42* (2013.01); *C03B 5/04* (2013.01); *F27D 1/1621* (2013.01); *F27D 2001/005* (2013.01)

(58) Field of Classification Search
CPC ....... F27D 2001/005; F27D 2001/0056; F27D 2001/0046–2001/0053; F27D 2001/0066;
(Continued)

(56) References Cited

U.S. PATENT DOCUMENTS 1,662,116 A   3/1928  Kingsley
1,767,832 A   6/1930  Brown
(Continued)

FOREIGN PATENT DOCUMENTS

DE      43 27 237        8/1994
DE   102008036790  *   2/2010  ............... C21B 7/12
(Continued)

OTHER PUBLICATIONS

JP2001-180951 machine translation provided by https://www4.j-platpat.inpit.go.jp/cgi-bin/tran_web_cgi_ejje?u= on Sep. 6, 2017.*
(Continued)

*Primary Examiner* — Jodi C Franklin
(74) *Attorney, Agent, or Firm* — Rankin, Hill & Clark LLP

(57) ABSTRACT

The invention relates to methods and to devices for a melting furnace, or for the conveying ones of the product to be melted, having an infinite life (furnace campaign). The same is achieved by means of the continuous/periodic, e.g. cyclic, exchange, in the optimum case, of all of the components surrounding the furnace interior/melting space, or surrounding the conveying lines, in that the components can be arranged/placed next to each other in a modular manner and that said components move in a certain direction while new individual parts are added at one of the free ends of the respective assembly and while worn/used individual parts are removed at the other free end of the respective assembly. For this purpose the individual components are held and/or moved by suitable receptacles, wherein the furnace interior/melting chamber remains stationary.

19 Claims, 14 Drawing Sheets

(51) Int. Cl.
*C03B 5/42* (2006.01)
*C03B 5/04* (2006.01)
*F27D 1/16* (2006.01)

(58) Field of Classification Search
CPC .. F27B 3/085; F27B 3/065; F27B 3/12; F27B 3/24; F27B 9/16; F27B 14/061; F27B 3/045; F27B 3/18; F27B 14/10; F27B 14/20; F27B 3/26; F27B 14/065; F27B 14/14; F27B 17/00; F27B 17/0083
See application file for complete search history.

(56) References Cited

U.S. PATENT DOCUMENTS

| | | | |
|---|---|---|---|
| 1,882,116 A | | 10/1932 | Bryan |
| 2,178,134 A | | 10/1939 | Blau et al. |
| 2,284,797 A | | 6/1942 | Blau et al. |
| 2,903,876 A | * | 9/1959 | Nannini ............... F27B 7/28 422/150 |
| 3,331,593 A | * | 7/1967 | Rea ............... F27B 9/243 432/235 |
| 4,061,487 A | * | 12/1977 | Kiyonaga ............... C03B 5/14 264/30 |
| 4,452,749 A | | 6/1984 | Kolvek et al. |
| 4,579,572 A | | 4/1986 | Duga et al. |
| 4,822,388 A | | 4/1989 | Gee |
| 4,848,750 A | * | 7/1989 | Jorquera ............ C22B 15/0043 264/30 |
| 4,920,899 A | | 5/1990 | Blundy et al. |
| 4,960,058 A | * | 10/1990 | Materna ............... F23M 5/00 110/336 |
| 5,445,661 A | | 8/1995 | Knauer |
| 5,536,291 A | | 7/1996 | Sorg et al. |
| 5,810,902 A | | 9/1998 | Brown et al. |
| 6,543,255 B2 | | 4/2003 | Bennett et al. |
| 7,383,943 B1 | | 6/2008 | Davis, Jr. |
| 2008/0115536 A1 | | 5/2008 | Shiraishi et al. |
| 2011/0180173 A1 | * | 7/2011 | Spies ............... C21B 7/12 138/111 |

FOREIGN PATENT DOCUMENTS

| | | |
|---|---|---|
| EP | 0 345 541 | 12/1989 |
| FR | 1156001 A | 5/1958 |
| GB | 300576 | 8/1929 |
| GB | 664 869 | 1/1952 |
| JP | 2001-180951 * | 7/2001 |
| WO | 2010/015687 | 2/2010 |

OTHER PUBLICATIONS

Communication issued by the European Patent Office dated Dec. 9, 2014 from European Patent Application No. 09 752 097.7, pp. 1-5.
Communication dated Oct. 29, 2015 with English translation from European Application No. 09 752 097.7, pp. 1-6.
Substantive Examination Report dated May 21, 2015 issued in Philippine Application No. 1/2011/500688, pp. 1-4.
Office Action dated Jan. 29, 2016 issued by the Canadian Intellectual Property Office for Canadian Patent Application No. 2,739,892, pp. 1-5.
Eurasian Office Action dated Dec. 15, 2015 from Eurasian Application No. 201170540/31, with English translation, pp. 1-4.

* cited by examiner

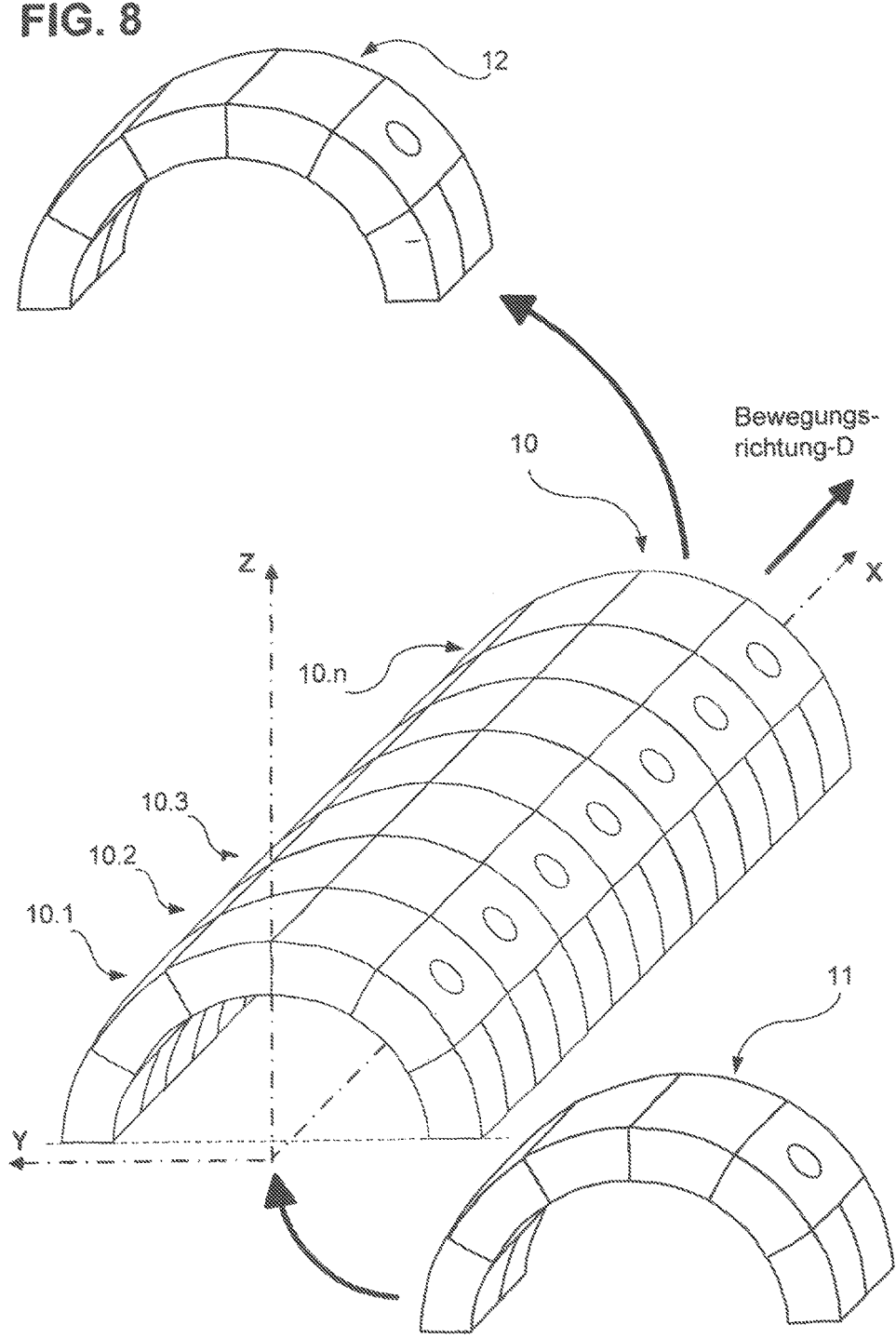

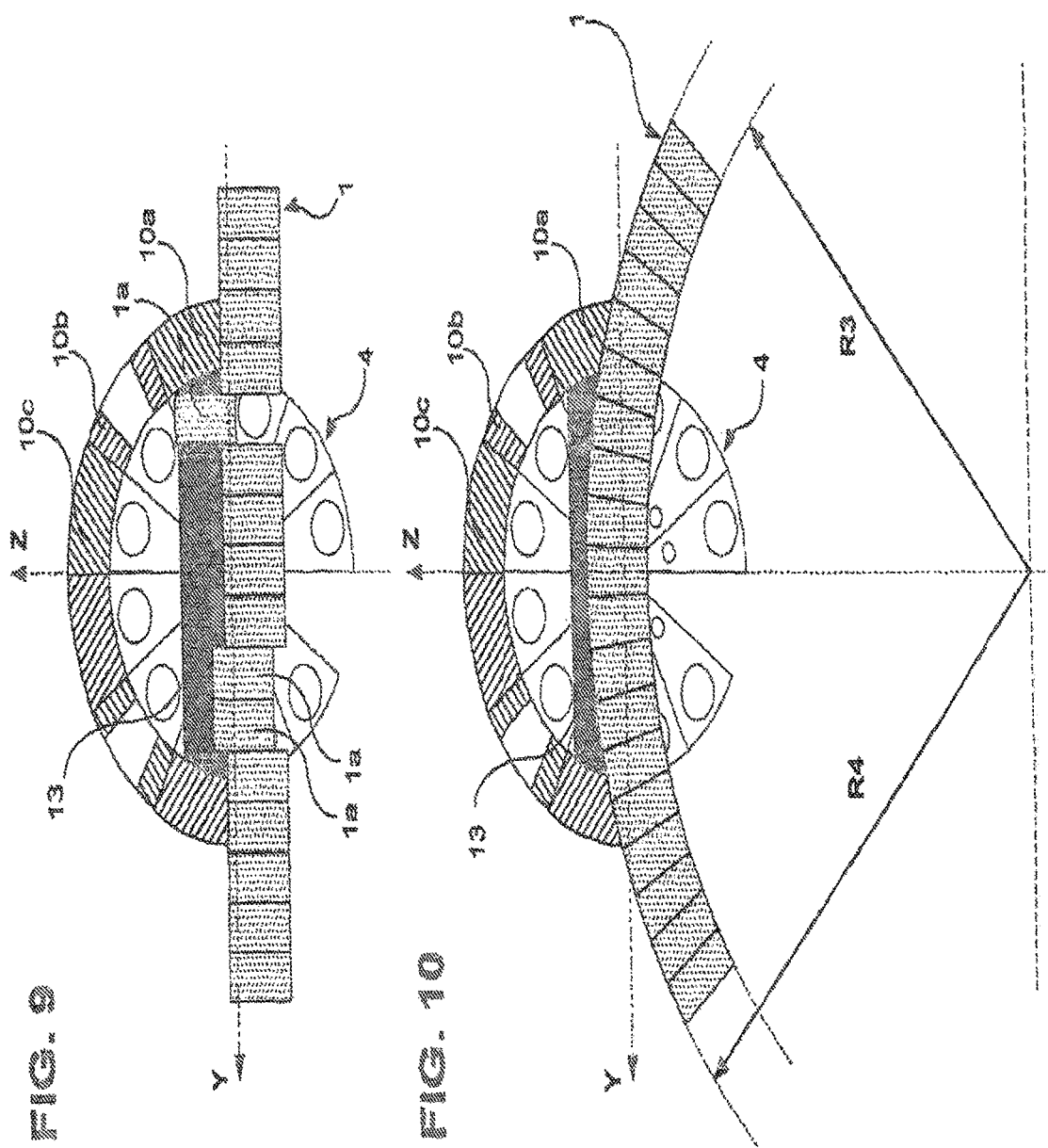

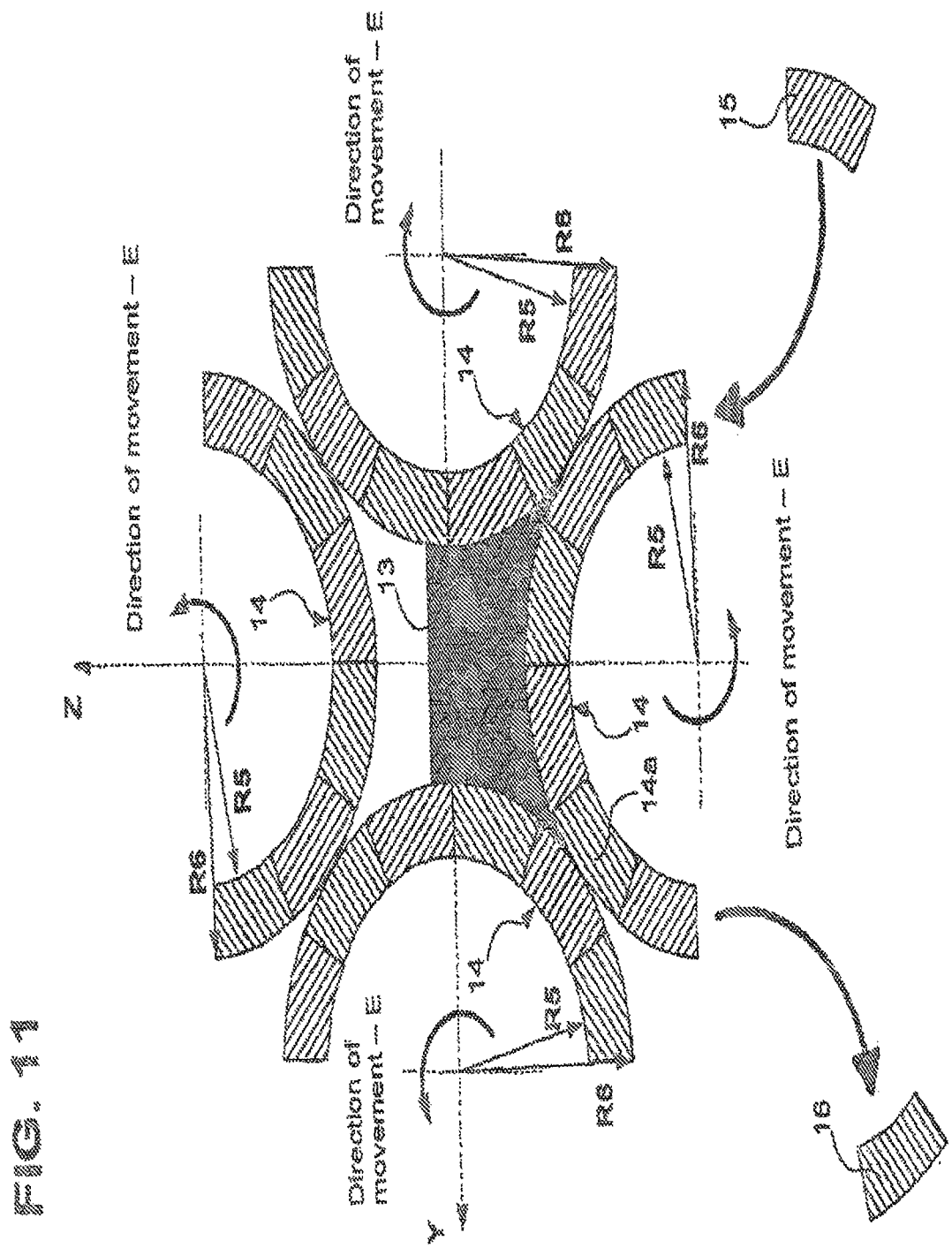

ial Patent Application No. PCT/EP2009/07101 filed on Oct. 5, 2009, and claims the benefit of German Patent Application No. 10 2008 050 855.1 filed on Oct. 8, 2008, all of which are herein incorporated in their entirety by reference.

MELTING FURNACE HAVING INFINITE FURNACE CAMPAIGN

CROSS-REFERENCE TO RELATED APPLICATIONS

This application is a continuation of U.S. patent application Ser. No. 13/123,120, filed Apr. 7, 2011, which application is a United States national phase application under 35 U.S.C. § 371 of International Patent Application No. PCT/EP2009/07101 filed on Oct. 5, 2009, and claims the benefit of German Patent Application No. 10 2008 050 855.1 filed on Oct. 8, 2008, all of which are herein incorporated in their entirety by reference.

FIELD

The invention relates to methods and apparatuses comprising a melting furnace with infinite furnace campaign that involves a continuous/periodical, thus cyclic exchange of, in the best case, all components of the melting furnace that surround the interior of the furnace/melting space, wherein the components are modularly placed or arranged next to each other, move in a predetermined direction, have a specific shape and are supported by suitable receptacles and moved and/or turned wherein the furnace interior/melting space remains stationary.

BACKGROUND

A melting furnace of this type is known from document DE 43 27 237 C1.

Known apparatuses in the area of glass melting technology are furnaces which are assembled from selected fireproof materials. In the simplest case, they are composed essentially of a base plate or base plates, sidewalls, a vault and an end wall or end walls, which together surround the inner space of the furnace or furnace interior/melting space. In order to keep the individual components in their predetermined position, and in order to absorb considerable forces in some areas, comprehensive steel constructions are necessary, which are sometimes identified under the term bracing or anchorage. The entire glass melting furnace is subject to wear (corrosion/erosion) and has therefore a limited lifetime (furnace campaign). In particular, in the area of the introduction/feeding of the glass raw material (feeder forepart) and of the glass exit (flux line), the glass contact stones undergo strong wear.

This type of furnace design for melting of glass is with respect to today's modern mechanical components, data analysis systems and control possibilities, short-lived, cost intensive and inefficient.

An exchange of worn out components of the melting furnace is, mainly due to the high temperature, only possible by shutting down and cooling down of the entire glass melting furnace whereby the fabrication of glass is stopped for a long period in time.

Repair of worn out components without shutting down and cooling down is only possible under limitations and prolongs the furnace campaign of the glass melting furnace only marginally.

After a few years the entire melting furnace has to be completely replaced.

It is therefore an object of the disclosure to provide methods and apparatuses that enable an infinite furnace campaign of melting furnaces, by implementing a periodical, thus cyclic exchange of the worn components of the melting furnace. The components are modularly aligned/arranged next to each other, and move in a certain direction. Thus, the components provide a specific shape and are supported by adapted receiving elements as the components are moved and/or turned, while the furnace interior/melting space remains stationary.

This object is resolved by the features of the present method and apparatus claims.

The respective examples are specified in the dependent claims.

Advantages achieved by the present disclosures are essentially that the melting furnace produces glass without interruption or without essential interruption and can be continuously adapted to new method and materials.

SUMMARY OF THE INVENTION

The object is solved essentially in a way that at least the component subassemblies (1, 4, 7, 10, 14, 17, 20, 23) of the melting furnace surrounding the furnace interior/melting space comprise individual components aligned with respect to each other or adjacently arranged individual components (1a, 4a, 7a, 10.1a to 10.na, 10.1b to 10.nb, 10.1c to 10.nc, 14a, 17a, 20a, 23a) or consist of a single piece that can differ in size, shape, design and material and which are formed corresponding to their respective specific requirements, provide receiving possibilities for the necessary support and/or moving elements and are moved in a certain direction wherein the individual components which are not moved (1a, 4a, 7a, 10.1a to 10.na, 10.1b to 10.nb, 10.1c to 10.nc, 14a, 17a, 20a, 23a) or the component subassemblies (1, 4, 7, 10, 14, 17, 20, 23) which are not moved are locally maintained in their determined place and the moved individual components (1a, 4a, 7a, 10.1a to 10.na, 10.1b to 10.nb, 10.1c to 10.nc, 14a, 17a, 20a, 23a) or the moved component subassemblies (1, 4, 7, 10, 14, 17, 20, 23), respectively, are moved in the respective predetermined direction and wherein at each beginning of the moving direction new individual components (2, 5, 8, 11, 15, 18, 21, 24) or new component subassemblies (1, 4, 7, 10, 14, 17, 20, 23) are attached or added to the corresponding components subassemblies (1, 4, 7, 10, 14, 17, 20, 23) and worn/used individual components (3, 6, 9, 12, 16, 19, 22, 25) or worn/used component subassemblies (1, 4, 7, 10, 14, 17, 20, 23) are removed form the respective component subassemblies (1, 4, 7, 10, 14, 17, 20, 23) at the end of the moving direction after the corresponding furnace campaign and the resulting wear or tear, wherein the shape of the aligned or adjacently arranged individual components (1a, 4a, 7a, 10.1a to 10.na, 10.1b to 10.nb, 10.1c to 10.nc, 14a, 17a, 20a, 23a), or component subassemblies (1, 4, 7, 10, 14, 17, 20, 23) can comprise at their contact position a smooth shape or other form known to a person skilled in the art, such as for example protrusions, indenting, dovetail, groove and tongue solutions, etc; this results in a continuous/periodical thus cyclical exchange of at least all individual components (1a, 4a, 7a, 10.1a to 10.na, 10.1b to 10.nb, 10.1c to 10.nc, 14a, 17a, 20a, 23a) or component subassemblies (1, 4, 7, 10, 14, 17, 20, 23) of the respective single components (1a, 4a, 7a, 10.1a to 10.na, 10.1b to 10.nb, 10.1c to 10.nc, 14a, 17a, 20a, 23a) or subassembly components (1, 4, 7, 10, 14, 17, 20, 23) surrounding the furnace interior/melting space, in the order of their supply or addition of the respective individual components (1a, 4a, 7a, 10.1a to 10.na, 10.1b to 10.nb, 10.1c to 10.nc, 14a, 17a, 20a, 23a) or subassembly components (1, 4, 7, 10, 14, 17, 20, 23) whereby an infinite furnace campaign is implemented and the furnace interior/melting room remains stationary.

The described methods and apparatuses are apparently connected by a common inventive concept, as is evident to a person skilled in the art, and particularly useful for use in melting furnaces and/or transport paths of the melting material or melt, for glass melting as well as for metal melting or for melt open of mineral basic materials for melting mixtures as well as for any type of melting material.

A glass melting furnace is described in the embodiments as an example.

The examples of the invention are explained with respect to FIGS. 1 to 17 for illustrative purposes, wherein each example can be configured as melting furnace, as a transport path for the melting material/melt (13) or similar for the further processing of the melt (13).

All FIGS. 1 to 17 are given in a orthogonal Cartesian coordinate system (X, Y, Z), they are however, not limited to the Cartesian coordinate system (X, Y, Z), but can be turned, moved or built up vice versa.

The shown directions of movement (A, B, C, D, E, F, G) of the individual component subassemblies (1, 4, 7, 10, 14, 17, 20, 23) are not limiting, only a mutual limitation of the component subassemblies (1, 4, 7, 10, 14, 17, 20, 23) in their movement/displacement has to be avoided.

The control/regulation of the movement of all or parts of the component subassemblies (1, 4, 7, 10, 14, 17, 20, 23) occurs by at least one data treatment system or neuronal data system in an analogue or digital way. The control/regulation of movement of the individual components (1a, 4a, 7a, 10.1a to 10.na, 10.1b to 10.nb, 10.1c to 10.nc, 14a, 17a, 20a, 23a) may also occur by the at least one data treatment system or neuronal data system in an analogue or digital way. The control/regulation of movement of single parts of the individual components (1a, 4a, 7a, 10.1a to 10.na, 10.1b to 10.nb, 10.1c to 10.nc, 14a, 17a, 20a, 23a) may also occur by the at least one data treatment system or neuronal data system in an analogue or digital way. Thus, the at least one data treatment system or the neuronal data system may be used to control the moving, turning, the local forces, and/or momentums of the component subassemblies (1, 4, 7, 10, 14, 17, 20, 23), parts of the component subassemblies (1, 4, 7, 10, 14, 17, 20, 23), individual components (1a, 4a, 7a, 10.1a to 10.na, 10.1b to 10.nb, 10.1c to 10.nc, 14a, 17a, 20a, 23a), or parts of the individual components (1a, 4a, 7a, 10.1a to 10.na, 10.1b to 10.nb, 10.1c to 10.nc, 14a, 17a, 20a, 23a).

BRIEF DESCRIPTION OF THE DRAWINGS

The figures show:

FIG. 8 a perspective view of the entire sidewall with vault (10) consisting of assembled arc segments of the entire sidewall with vault (10.1 to 10.n) with indication of the direction movement (D) of the entire sidewall with vault (10) and illustration of the addition of a new arc segment of the sidewall with vault (11) and removal of a worn out/used arc segment of the sidewall with vault (12).

FIG. 9 a cross section of a possible design of the melting furnace with illustration of height adjustable individual elements of the base plate (1a) in the Y-Z-plane.

FIG. 10 a cross section of a possible design of the melting furnace with illustration of the base plate (1) in form of a lying straight cylinder which is at least partly hollow, in the Y-Z-plane.

FIG. 11 a cross section of a possible design of the melting furnace or the transport path of the melt (13) with illustration of the four surfaces surrounding the melt (14), in the Y-Z-plane.

DETAILED DESCRIPTION OF THE INVENTION

FIGS. 1 to 8 show, as explained below, a method and the apparatus as claimed in a preferred example that is arranged such that the melting furnace can continuously fabricate melt (13) without a considerable limitation in time.

Figure 1:
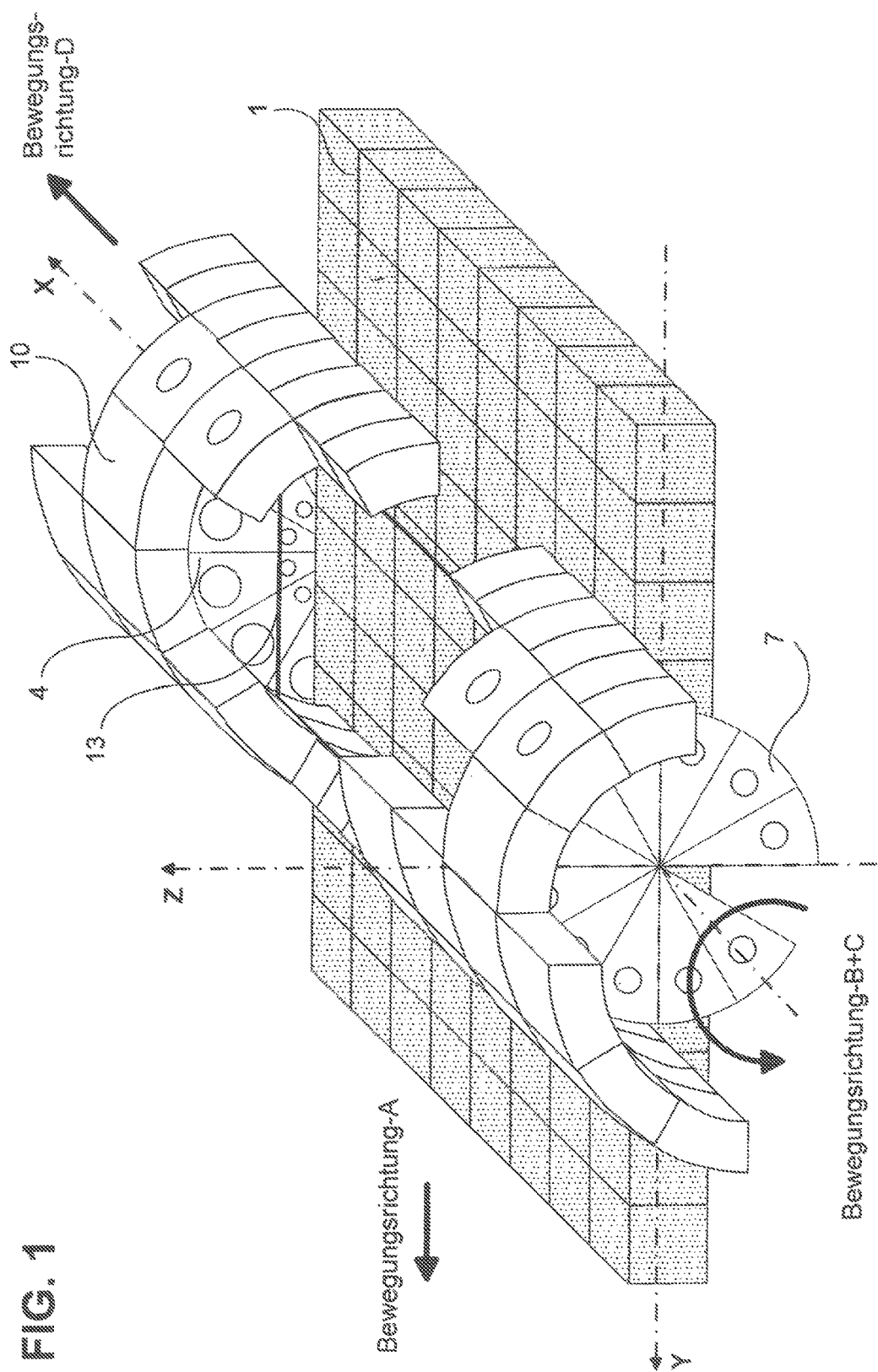
FIG. 1 a perspective view of the entire melting furnace with view into the interior of the melting furnace through cut-out parts of the entire sidewall with vault (10).
Figure 2:
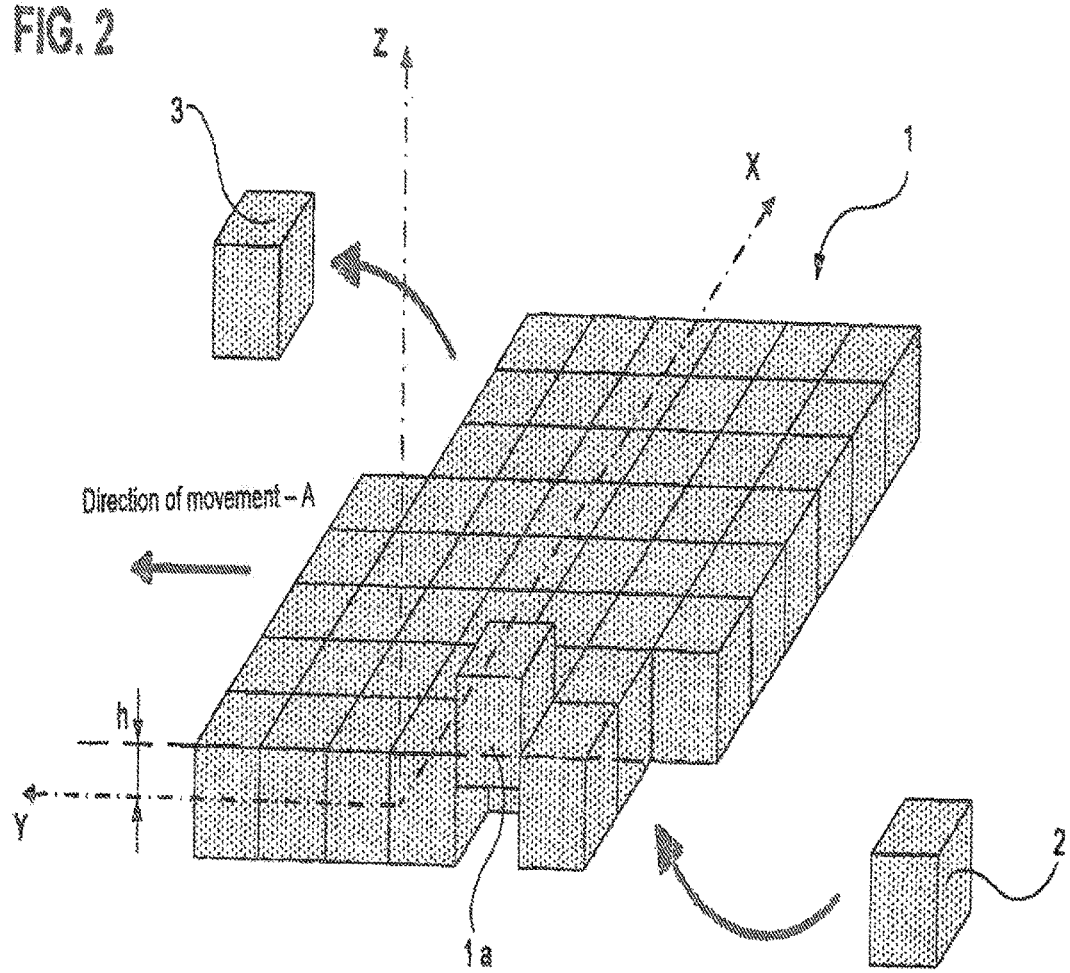
FIG. 2 a perspective view of the base plate/bottom (1) with indication of the direction of movement (A) of the base plate (1) as well as the addition of a new individual element of the base plate (2) and removal of a worn out/used individual element of the base plate (3).
Figure 3:
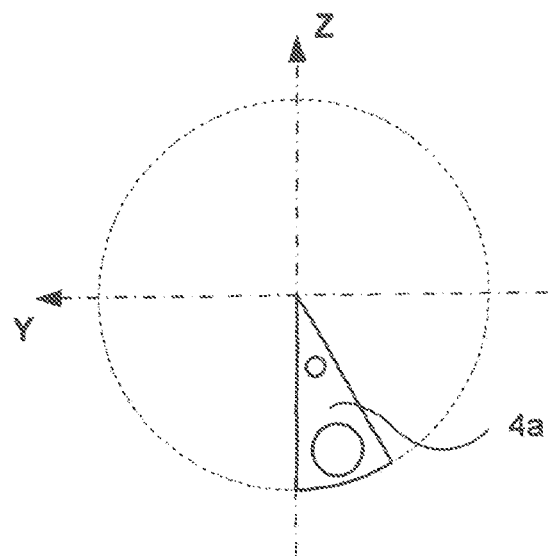
FIG. 3 a front view of an individual element of the end wall at the side of the raw material feeding (4a) with openings for exhaust gas and raw material addition; in the Y-Z-plane.
Figure 4:
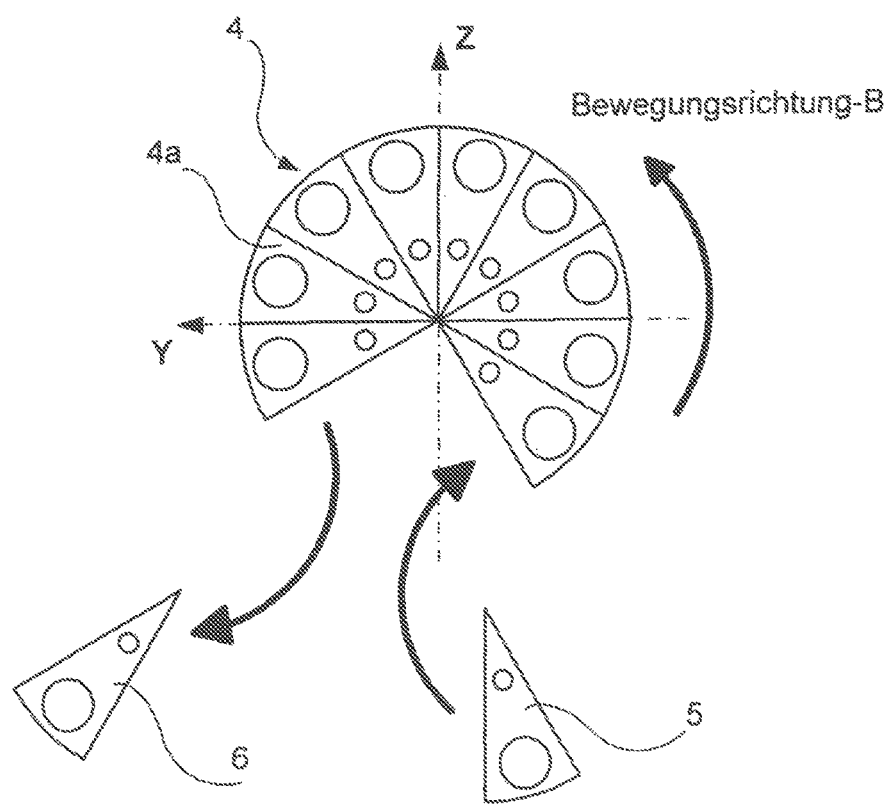
FIG. 4 a front view of the entire end wall at the side of raw material feeding (4) consisting of individual elements of the end wall at the side of the raw material feeding (4a) and illustration of the addition of new individual elements of the end wall at the side of the raw material feeding (5) and removal of a worn out/used individual element of the end wall at the side of the raw material feeding (6); in the Y-Z-plane.
Figure 5:
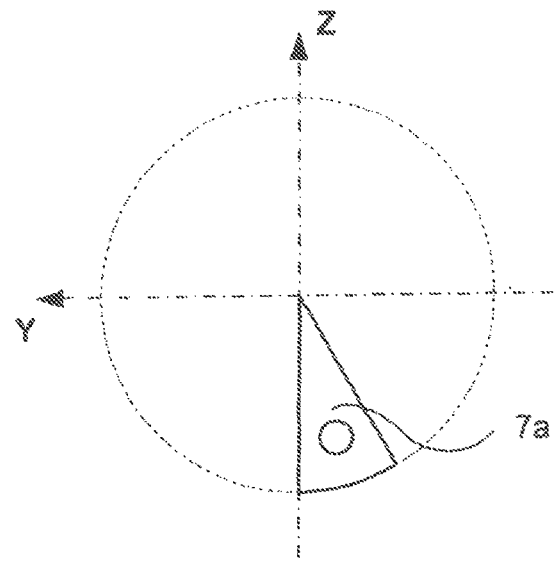
FIG. 5 a front view of an individual element of the end wall at side of the exit of the melting material (7a) with an opening for the melting material; in the Y-Z-plane.
Figure 6:
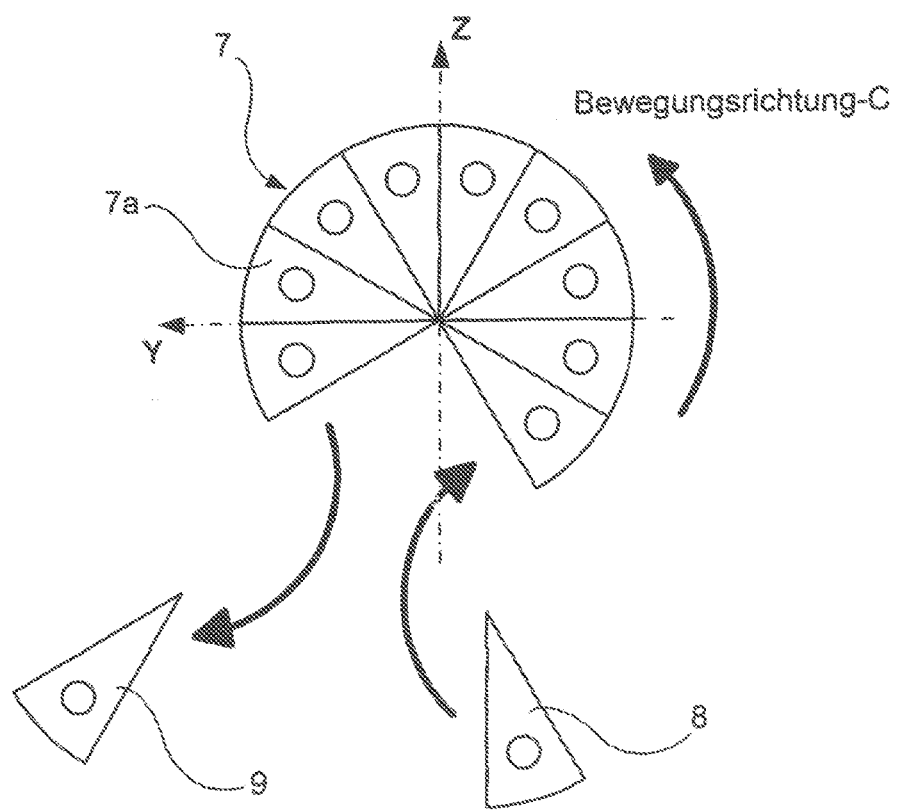
FIG. 6 a front view of the complete end wall at the side of the outlet for the melt (7), consisting of individual elements of the end wall at side of the melt outlet (7a) with indication of the direction of movement (C) of the end wall at the side of the melt outlet (7) and indication of the addition of a new individual element of the end wall at the side of the melt outlet (8) and removal of a worn out/used individual element of the end wall at the side of the melt outlet (9); and the Y-Z-plane.

FIG. 1 shows the melting furnace with the directions of movement (A, B, C, D) of the respective components subassemblies (1, 4, 7, 10) in a perspective view with viewing direction into the interior of the melting furnace, through cut-out parts of the entire sidewall with vault (10), wherein the shape of the furnace interior/melting space is a flat straight partial cylinder whereof a straight cutting plane is parallel to the lateral line, wherein orthogonal to the cutting plane two identical parallel segments of a circle are formed, the bottom/base and covering surface, a centre point of which is, with respect to a full circle, outside of a surface of these segments of the circle and which cross the X-axis; this bottom/base surface and the covering surface of the furnace interior/melting space is limited from the exterior by two end walls (4, 7) the centre point of which is, with respect to a full circle, also on the X-axis, wherein the vaulted or arched lateral surface of the furnace interior/melting space is delimited from the exterior by the entire sidewall with vault (10) and the remaining cutting plane of the furnace interior/melting space, the plane of section which forms a rectangle, delimits the furnace interior/melting space from the exterior with the base plate/bottom (1). FIG. 2 shows the base plate/bottom (1) of the melting furnace comprising modular cuboidal shaped individual elements of the base plate (1*a*) that can be aligned or arranged next to each other, which move translationally in a predetermined direction, the direction of movement-A along the Y-axis in the direction of positive Y-values, while a continuous/periodical, thus cyclic addition of new individual elements of the bottom (2) at the side of negative Y-values occurs and worn/used individual elements of the bottom (3) are removed at the side of positive Y-values, wherein the velocity of the movement of the bottom (1) occurs in a manner corresponding to the wear or use of the individual elements of the bottom (1*a*) such that the entity of bottom (1) remains stationary and the distance at the bottom (1) in direction of the Y-axis is lager than two times R2 of the sidewall with vault (10) to ensure an addition of new individual elements of the bottom (2) and/or the removal of worn out/used individual elements of the bottom (3) outside of the furnace interior/melting space wherein the surface of the bottom (1) which is oriented towards the furnace interior/melting space is in the X-Y-plane, for Z=h and h>0 in order to ensure a secure closure of the furnace interior/melting space with respect to the entire sidewall with vault (10) and the two end walls (4, 7) and to enable a rotational movement of the sidewalls (4, 7) wherein a portion of both surfaces of the bottom (1) form a limitation to both end walls (4, 7) they are in contact with in the Y-Z-plane. FIG. 3 shows an individual element of the end wall at the side of raw material feeding (4*a*) in the Y-Z-plane in form of a straight cylinder segment, each with a lead-through for the feeding of raw material and for the exhaust gases. FIG. 4 shows the assembled end wall at the side of the raw material feeding (4), comprising individual elements of the end wall at the side of the raw material feeding (4*a*) adjacently aligned/arranged next to each other, such that a cylinder segment with an obtuse angle forms, a centre point of which crosses, with respect to two oppositely arranged individual elements of the end wall at the side of the raw material feeding (4*a*), the X axis and wherein the end wall at the side of the raw material feeding (4) rotates around this X-axis in direction of movement-B, such that at one of both free ends of the end wall at the side of the raw material feeding (4) new individual elements of the end wall at the side of the raw material feeding (5) is added in the same angel degree or essentially in the same angle degree, while at the other free end of the end wall at the side of raw material feeding (4) the worn/used individual elements at the side of the raw material feeding (6) can be removed and that the rotating speed of the end wall at the side of the raw material feeding (4) depends essentially on the wear of the individual elements of the end wall at the side of the raw material feeding (4*a*), wherein each individual element of the end wall at the side of raw material feeding (4*a*) normally performs during its furnace campaign a rotational movement which is less than a complete three-hundred-sixty degree rotation and the surface of the end wall at the side of raw material feeding (4) oriented towards the furnace interior/melting space closes or terminates in the Y-Z-plane with the surfaces of the bottom (1) they are in contact with in the Y-Z-plane. FIG. 5 shows an individual element of the end wall at the side of melt outlet (7*a*) in the Y-Z-plane in form of a straight cylinder segment with a lead-through the molten material/melt (13). FIG. 6 shows the assembled end wall at the side of the melt outlet (7) which is arranged parallel to the end wall at the side of the raw material feeding (4) at the opposite side of the bottom (1) in the Y-Z plane, the end wall at the side of the raw material feeding (4), comprising individual elements of the end wall of the side of the melt exit (7*a*) aligned or arranged next to each other in a form such that a cylinder segment with a obtuse angle forms, a centre point of which is with respect to two individual elements of the end wall at the side of the melt outlet (7*a*) which are arranged opposite to each other, on the X-axis and wherein the end wall at the side of the melt outlet (7) turns in rotation around this X-axis, the direction of movement-C such that at one of both free ends of the end wall at the side of the melt outlet (7) new individual elements of the end wall at the side of the melt outlet (8) can be repeatedly added in the same angle degree or essentially in the same angle degree while at the other free end of the end wall at the side of the melt outlet (7) a worn out/used individual element of the end wall at the side of the melt outlet (9) can be removed and the rotational speed of the end wall at the side of the melt outlet (7) is mainly based on the wear of the individual elements at the end wall at the side of the melt outlet (7*a*) wherein each one of the individual elements of the end wall at the side of the melt exit (7*a*) normally performs during a furnace campaign a rotational movement which is less than a complete turn and the surface of the end wall at the side of the melt outlet (7) facing towards the furnace interior/melting space in the Y-Z-plane terminates/close with the surface of the bottom (1) in the Y-Z-plane, which is opposite to the surface of the end wall at the side of the raw material feeding (4) oriented towards the furnace interior/melting space, the furnace interior/melting space.

Figure 7:
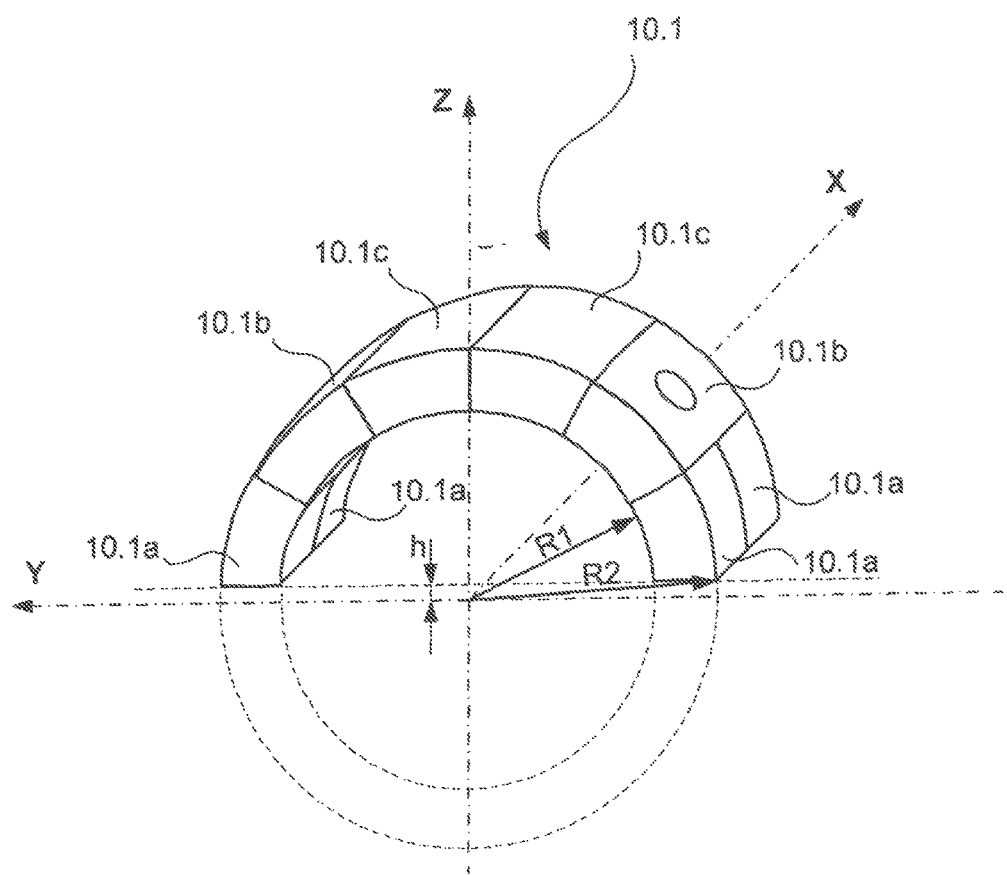
FIG. 7 a perspective view of an arc segment of the sidewall with vault (10.1) consisting of individual elements, the individual sidewall element (10.1a), the individual nozzle brick element (10.1b) and the individual vault element (10.1c).

FIG. 7 shows an arc segment of the entire sidewall with vault (10.1) in form of a lying straight partial hollow cylinder, the straight cutting plane of which is parallel to the lateral line, wherein two identical parallel annular segments form orthogonal to the cutting plane, the bottom surface and the cover surface of the arc segment of the entire sidewall with vault (10.1), the centre point of which is, in relation to the entire circular ring is outside of the centre point of the plane of these annular elements and which goes through the X-axis, wherein, for the distance h=0, the bottom surface and the cover surface of the arc segment of the entire sidewall with vault (10.1) would form circular rings, wherein the arc segment of the entire sidewall with vault (10.1) is a straight hollow cylinder, wherein the difference of the radii R2-R1 (for R1<R2) represents the wall thickness of the arc segment of the entire sidewall with vault (10.1) and the both cutting planes of the straight partially hollow cylinder of the arc segment of the entire sidewall with vault (10.1), which are rectangles, respectively that are in the X-Y-plane for Z=h with h>0 and smallest distance of which from the X-axis is R1 respectively, lie on the surface of the bottom (1) which faces towards the furnace interior/melting space in order to delimit the furnace interior/melting space, wherein the arc segment of the entire sidewall with vault (10.1) comprises individual elements (10.1a, 10.1b, 10.1c) corresponding to the respective requirement, such that, from the Z-plane for Z=h the stones in contact with glass are formed as soldier courses or palisades and built the individual sidewall element (10.1a), on which the nozzle brick/throat/quarl in form of an individual nozzle brick element (10.1b) is arranged, and the vault formed from an individual vault element (10.1c), which form together the entire partial hollow cylinder of the arc segment of the entire sidewall with vault (10.1), the vaulted inner lateral surface of which limits the lateral surface of the furnace interior/melting space. FIG. 8 shows the entire sidewall with vault (10) in a form, wherein the individual arc segments of the entire sidewall with vault (10.1 to 10.n) are aligned/arranged next to each other at their respective bottom surfaces and their cover surfaces such that both cutting planes of the straight partial hollow cylinders of the respective arc segments of the entire sidewall with vault (10.1 to 10.n) which are a rectangle, respectively, that lie in the X-Y-plane for Z=h and the lowest distance of which is R1 from the X-axis, respectively, lie in a plane and on the surface of the bottom (1) oriented towards the furnace interior/melting space in order to delimit the furnace interior/melting space, wherein the total number of arc segments of the entire sidewall with vault (10.1 to 10.n) of the entire sidewall with vault (10) forms at least one cover for the entire vaulted casing/mantle of the furnace interior/melting space and the entire sidewall with vault (10) moves in a predetermined direction in translation with direction of movement-D along the X-axis in the direction of positive X-values while new arc segments of the entire sidewall with vault (11) are continuously/periodically thus cyclically added at the side of negative X-values and worn out/used arc segments of the entire sidewall with vault (12) are removed at the side of positive X-values, wherein the velocity of movement of the entire sidewall with vault (10) occurs in a manner corresponding to the occurrence of wear/use of the individual arc segments of the entire sidewall with vault (10.1 to 10.n).

It is, of course, although possible that the raw material feeding and/or the removal of the melt (13) occurs via the base plate/bottom (1) in a manner, that suitable openings are provided in selected individual elements of the base plate (1a), in this case an infinite furnace campaign without interruptions of the flow of melting material is possible.

The addition of raw materials, energy, the removal of melt (13), exhaust gases and the intake of measurement probes or others can, if it makes technical sense, be inserted through suitable openings in all component subassemblies (1, 4, 7, 10, 14, 17, 20, 23) or in the respective individual elements (1a, 4a, 7a, 10.1a to 10.na, 10.1b to 10.nb, 10.1c to 10.nc, 14a, 17a, 20a, 23a) of the respective component subassemblies (1, 4, 7, 10, 14, 17, 20, 23), or can be integrated in individual elements (1a, 4a, 7a, 10.1a to 10.na, 10.1b to 10.nb, 10.1c to 10.nc, 14a, 17a, 20a, 23a) of the respective component subassemblies (1, 4, 7, 10, 14, 17, 20, 23), this also applies for bridge walls or individual elements of bridge walls; with suitable arrangement of quarls/nozzle bricks of individual nozzle brick/quarl elements (10.1b to 10.nb), it is possible to exhaust the exhaust gases through these openings, after removing of the burners.

By lifting or lowering of individual elements of the bottom (1a), as shown in FIG. 9 out of the plane of the entire surface of the bottom (1), a modification of the current in the melt (13) or barriers in the melt (13) for the promotion of current fields in the melt (13) or aid for the withdraw or local binding of impurities in the melt (13) can be achieved, as well as the lifting of single pieces of the bottom (1a) for modifying the gaseous current fields in the upper part of the furnace, as well as for the follow up of the individual elements of the bottom (1a) in an existing wear of the individual elements of the bottom (1a) or for a cross movement of the individual element of the bottom (1a) with corresponding implementation of the individual element of the bottom (1a) from the plane of the entire surface of the ground plate (1), wherein these cross wise movements as well as the follow up with existing wear is of course also possible for all other individual elements (4a, 7a, 10.1a to 10.na, 10.1b to 10.nb, 10.1c to 10.nc, 14a, 17a, 20a, 23a) of the respective component subassemblies (4, 7, 10, 14, 17, 20, 23) for all different modifications of the melting bath (13) or modifications of the gaseous phases or similar which are known to a person skilled in the art.

For easy arrangement/alignment of the individual elements of the end wall (4a, 7a), of the individual elements of a bridge wall between single separated chambers with respect to each other, individual elements of the end wall (4a, 7a) or individual elements of the bridge wall can, in place of the shape of a straight cylinder segment, be in form of a straight hollow cylinder segment in both cases, for the cylinder segment as well as for the hollow cylinder segment the expression cylinder segment is used.

The arc segments of the entire sidewall with vault (10.1 to 10.n) can also comprise more different individual elements (10.1a, 10.1b, 10.1c) than the given three individual elements (10.1a, 10.1b, 10.1c), the individual sidewall element (10.1a), the individual nozzle brick or throat element (10.1b) and the individual vault element (10.1c) which can also move with respect to each other or in opposing directions with respect to each other and/or with different velocities; the vault (10.1c to 10.nc) can be termed ceiling in a planar embodiment; the arc segments of the entire sidewall with vault (10.1 to 10.n) as well as the other component subassemblies (1, 4, 7, 10, 14, 17, 20, 23) can fulfil further requirements beside their intended use, for example, the arc segments of the entire sidewall with vault (10.1 to 10.n) over the cover of the melting furnace can be a cover for other processes of the melt (13), for example a cover of transport paths of the melt (13) or a cover of an exhaust channel, up to the delivery of the exhaust gases to the atmosphere and with a corresponding implementation also of the recuperative process, the heat exchange of the combustion air.

In case of continuation of the sidewalls with vault (10.1 to 10.n) as limitation for the exhaust gases with respect to the atmosphere, it is also possible to use a planar base plate (1) of the exhaust channel, the so-called fox as well as one or more adjacently arranged vaulted bottoms (1), in cylindrical form, as partially hollow cylinder with eventually different radii (R3, R4).

The entire melting furnace can also comprise a plurality of chambers arranged one after the other, the separation of which comprises an additional separation wall, bridge wall or end wall (4, 7) in between the chambers and may be connected by transport paths and which allow material and energy currents by suitable openings in order to separate manufacturing phases; these separation/bridge walls or end walls (4, 7) can comprise several separation walls (4, 7) or end walls arranged directly one after the other which are moveable in translation or rotation with respect to each other in order to time wise close, open or delimit openings or apertures.

In the same way the translational or rotational velocity of the respective component subassemblies (1, 4, 7, 10, 14, 17, 20, 23) can be adapted with a modification or change of individual elements (4a, 7a, 10.1a to 10.na, 10.1b to 10.nb, 10.1c to 10.nc, 14a, 17a, 20a, 23a) for serious test series, with a defect or similar, such that these individual elements (1a, 4a, 7a, 10.1a to 10.na, 10.1b to 10.nb, 10.1c to 10.nc, 14a, 17a, 20a, 23a) of the melting furnace or the transport path can be removed as fast as possible in order to prevent damages, problems or impurities in the melt (13) or in the entire melt and manufacturing system.

A rotation or turn of rotational component subassemblies (4, 7, 10, 14, 17, 20, 23) during the furnace campaign during a complete turn is also possible, as well as a fast rotational movement of rotational component subassemblies (4, 7, 10, 14, 17, 20, 23) in comparison to other moveable component subassemblies (1, 4, 7, 10, 14, 17, 20, 23) or a fast translational displacement of translational component subassemblies (1, 10, 17) in comparison to other moveable component subassemblies (1, 4, 7, 10, 14, 17, 20, 23) is possible. The movement/displacement of individual component subassemblies (1, 4, 7, 10, 14, 15, 17, 20, 23) can be achieved by a force applied on the resulting alignment/arrangement/contact surface of the individual elements which was the last to be added (1a, 4a, 7a, 10.1a to 10.na, 10.1b to 10.nb, 10.1c to 10.nc, 14a, 17a, 20a, 23a) or on the alignment/arrangement/contact surface of the individual element that was the last to be added (1a, 4a, 7a, 10.1a to 10.na, 10.1b to 10.nb, 10.1c to 10.nc, 14a, 17a, 20a, 23a) of the respective component subassembly (1, 4, 7, 10, 14, 15, 17, 20, 23) or in the case of a component subassembly (1, 4, 7, 10, 14, 15, 17, 20, 23) consisting of one exchangeable element at the alignment or arrangement surface of which the subsequent exchangeable element in the direction of the respective direction of movement (A, B, C, D, E, F, G) of the respective component subassemblies (1, 4, 7, 10, 14, 15, 17, 20, 23).

In order to delimit forces and moments on the single elements (1a, 4a, 7a, 10.1a to 10.na, 10.1b to 10.nb, 10.1c to 10.nc, 14a, 17a, 20a, 23a) on certain individual elements (1a, 4a, 7a, 10.1a to 10.na, 10.1b to 10.nb, 10.1c to 10.nc, 14a, 17a, 20a, 23a) or on entire component subassemblies (1, 4, 7, 10, 14, 15, 17, 20, 23), the individual elements (1a, 4a, 7a, 10.1a to 10.na, 10.1b to 10.nb, 10.1c to 10.nc, 14a, 17a, 20a, 23a) parts of the individual elements (1a, 4a, 7a, 10.1a to 10.na, 10.1b to 10.nb, 10.1c to 10.nc, 14a, 17a, 20a, 23a) or the entire component subassemblies (1, 4, 7, 10, 14, 15, 17, 20, 23) can be turned, twisted or moved force and back.

The heating up of the newly attached or added individual elements (2, 5, 8, 11, 15, 18, 21, 24) at the respective component subassemblies (1, 4, 7, 10, 14, 17, 20, 23) can happen mainly or exclusively by heat exchange with the respective component subassemblies (1, 4, 7, 10, 14, 17, 20, 23) at which the newly added or attached individual elements (2, 5, 8, 11, 15, 18, 21, 24) are added or attached, as well as the cooling down of worn or used single elements (3, 6, 9, 12, 16, 19, 22, 25) can occur in the same way.

The invention is also applicable for a plurality of different designs of melting furnaces:

FIG. 10 shows in a cross section in the Y-Z-plane a possible design of a melting furnace or a transport path of the melt (13) with a vaulted, thus cylindrical bottom (1), the radius centre of which lies in the direction of negative Z-values on the Z-axis with radius R3 and R4, a vaulted bottom (1) the radius centre point of which lies in the direction of positive Z-values is also possible, wherein a modified shape of the individual elements of the bottom (1a) as well as a modified form of the individual sidewall elements (10.1a to 10.na) results with a curvature of the ground plate (1) with a radius centre point of the ground plate (1) with positive and with negative Z-values on the Z-axis.

FIG. 11 shows in a cross section in the Y-Z-plane a possible design of a melting furnace or a transport path of the melt (13) with representation of four surrounding surfaces of the melt (14) in cylindrical shape as partially hollow cylinders, whereof the outer lateral surfaces are in contact with each other whereby their radius centre points (R5, R6) are outside of the furnace interior/melting space or the melt (13) with indication of the direction of movement (E) of the respective surrounding surfaces of the melt (14) and an exemplary representation of the addition a new individual element to one of the surrounding surfaces of the melt (15) and exemplary representation of the removal of a worn out/used individual element at one of the surrounding surfaces of the melt (16), without the plain end faces.

Figure 12:
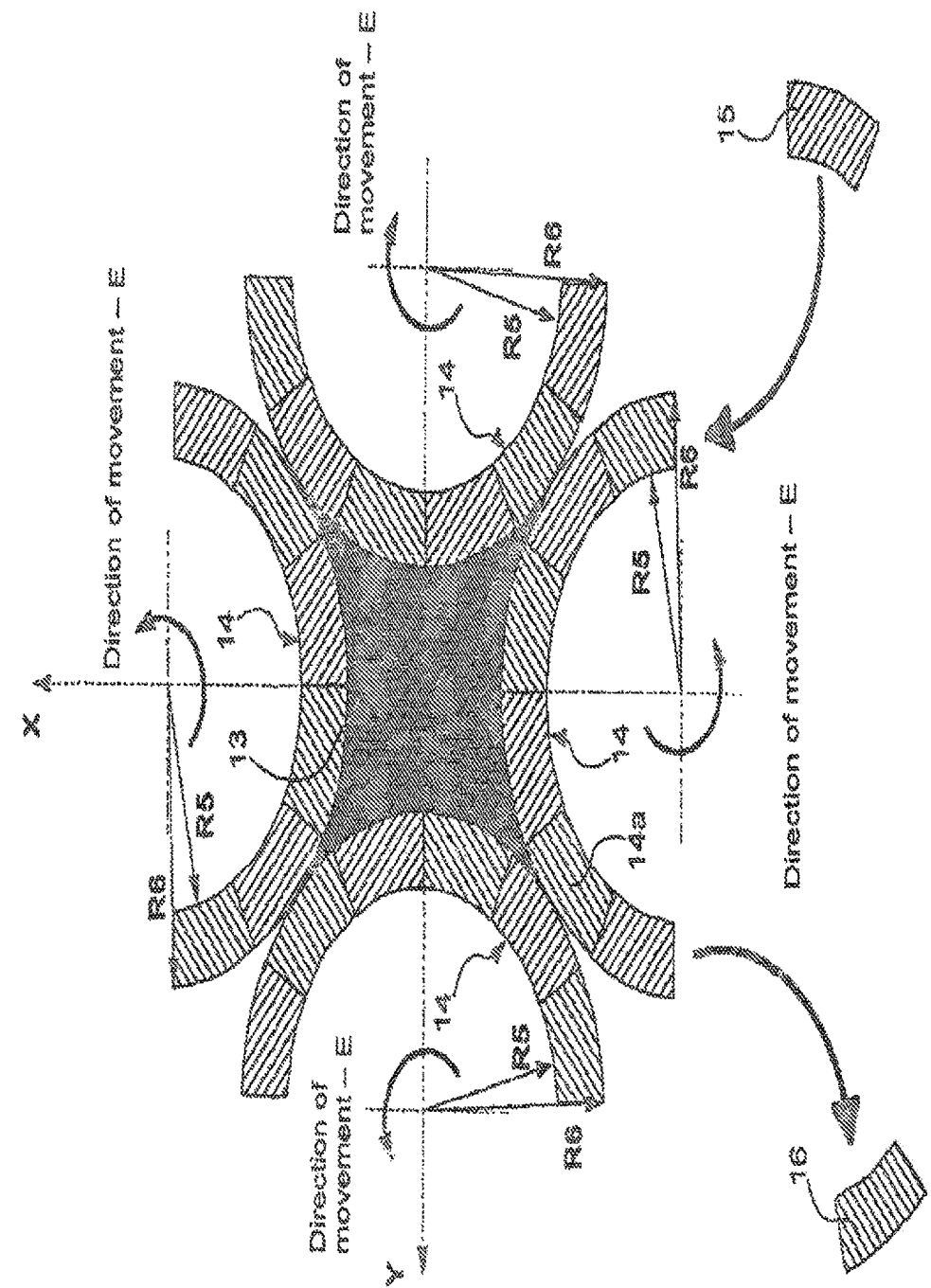
FIG. 12 a top view of a possible design of the melting furnace or of the transport path of the melt (13) without plain covering surfaces closing the furnace interior/melting space, with indication of four surfaces surrounding the melt (14) in the X-Y-plane.

FIG. 12 shows in a top view in the X-Y-plane a possible design for melting furnace or of a transport path of the melt (13) without furnace interior/melting space, respectively a plane covering surface delimiting the transport path, with representation of four surrounding surfaces of the melt (14) in cylindrical form as partial hollow cylinders, whereof the outer lateral surfaces are in contact with each other, wherein their radius centre points (R5, R6) are each outside the furnace interior/melting space, with indication of the direction of movement (E) of the surfaces surrounding the melt (14) and exemplary representation of the addition of a new individual element at one of the surrounding surfaces of the melt (15) and exemplary representation of the removal of a worn out/used individual element at one of the surrounding surfaces of the melt (16).

Figure 13:
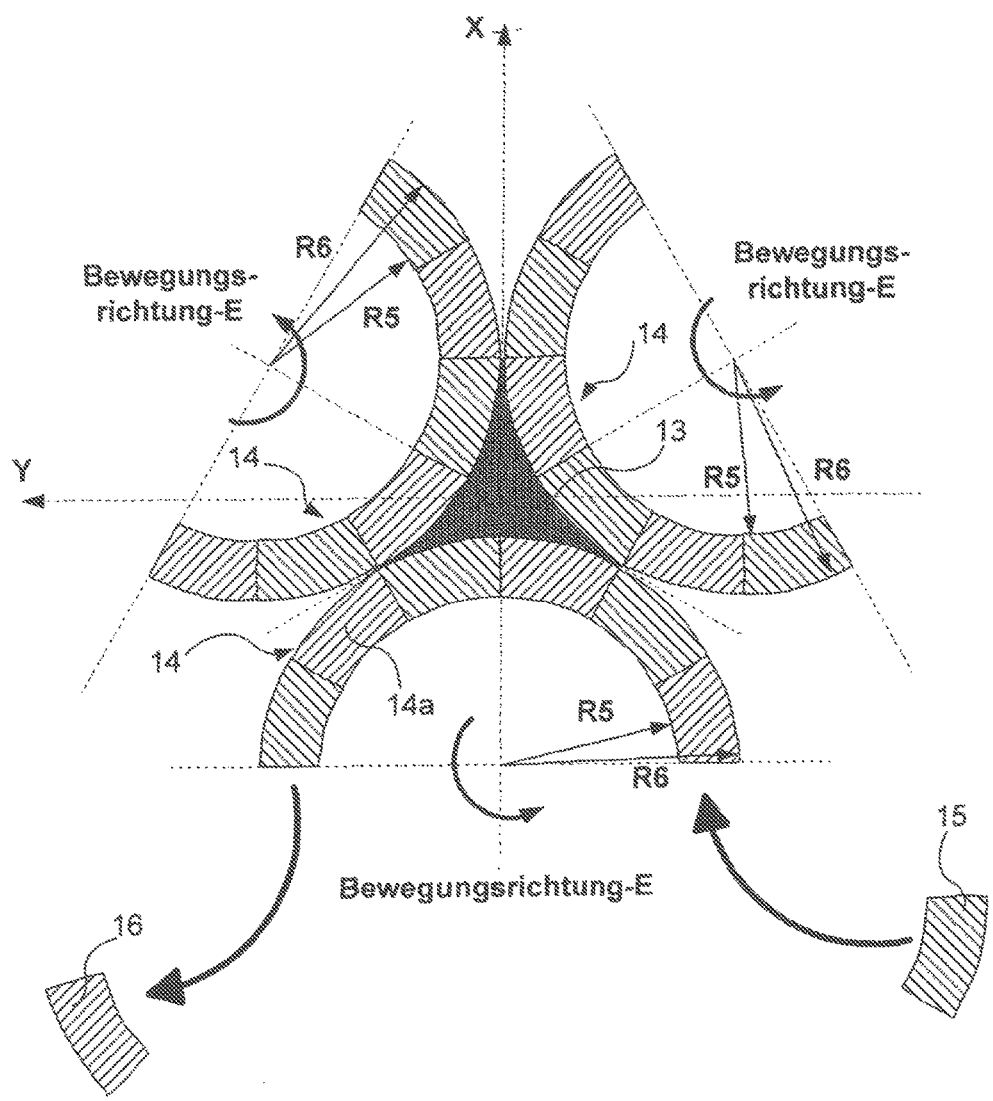
FIG. 13 a top view of a possible design of the melting furnace or of the transport path of the melt (13) without the plain covering surfaces closing the furnace interior/melting space with indication of the three planes surrounding the melt (14) in the X-Y-plane.

FIG. 13 shows in a top view in the X-Y-plane a possible design of a melting furnace or a transport path of the melt (13) without planar covering surfaces delimiting the furnace interior/melting space, with representation of three surrounding surfaces of the melt (14) as partial hollow cylinders whereof the exterior lateral surfaces are in contact with each other, whereby the radius centre points (R5, R6) are each outside the furnace interior/melting space, with indication of the direction of movement (E) of the respective surrounding surfaces of the melt (14) and exemplary representation of the addition of a new individual element at one of the surrounding surfaces of the melt (15) and exemplary representation of the removal of a worn out/used individual element at one of the surrounding surfaces of the melt (16) wherein at least two of the surrounding surfaces of the melt (14) should be designed cylindrically while one of the three surrounding surfaces of the melt (14) can be planar, such as for example a plain sidewall (17).

Figure 14:
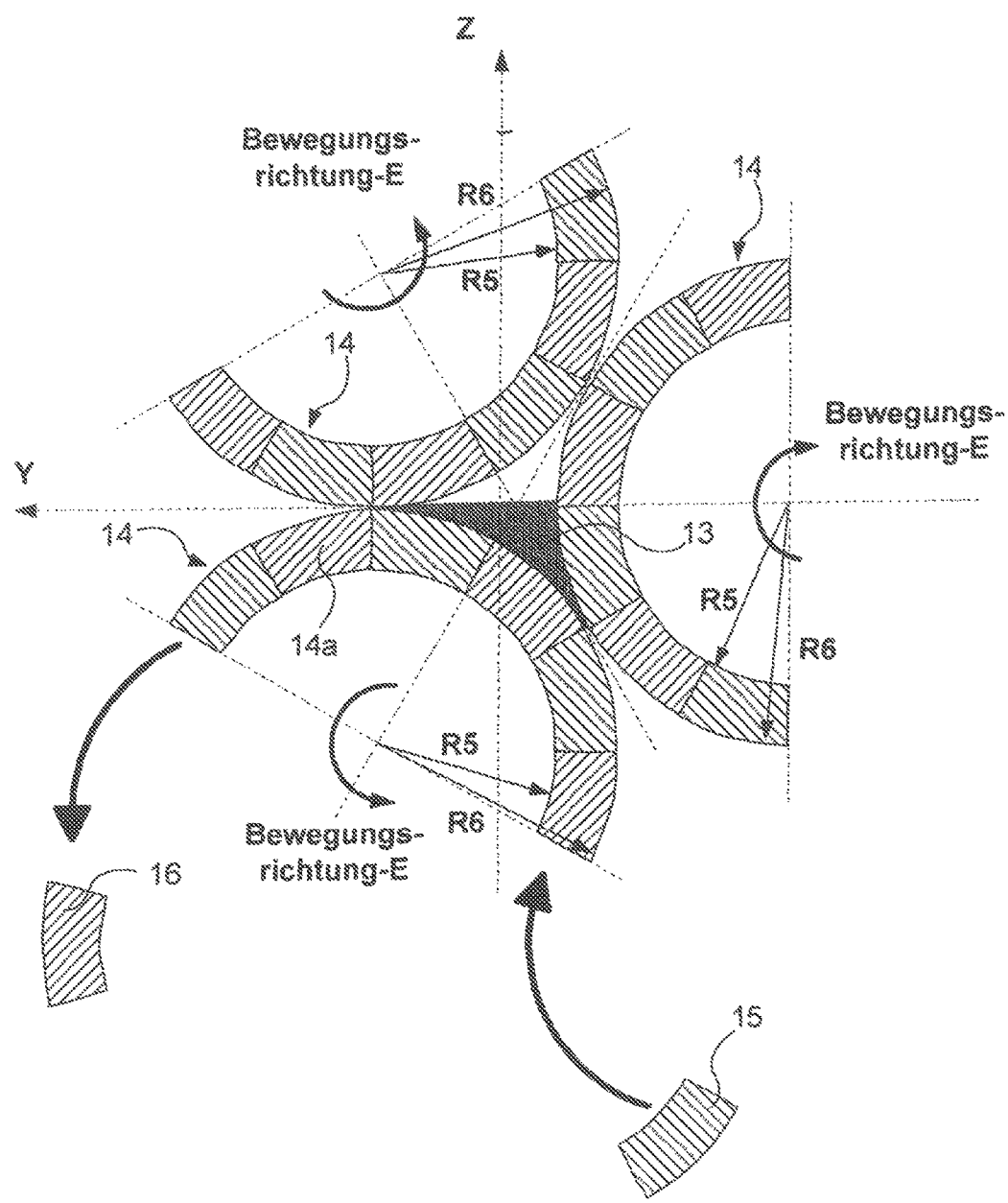
FIG. 14 a cross section of a possible design of the melting furnace or of the transport path of the melt (13) with indication of the three planes surrounding the melt (14) in the Y-Z-plane FIG. 15 a top view of a possible design of the melting furnace or of the transport path of the melt (13) without the plain covering surfaces closing the furnace interior/melting space, with indication of the two plain sidewalls (17) and of two surrounding surfaces of the melt (14) in the X-Y-plane.
Figure 15:
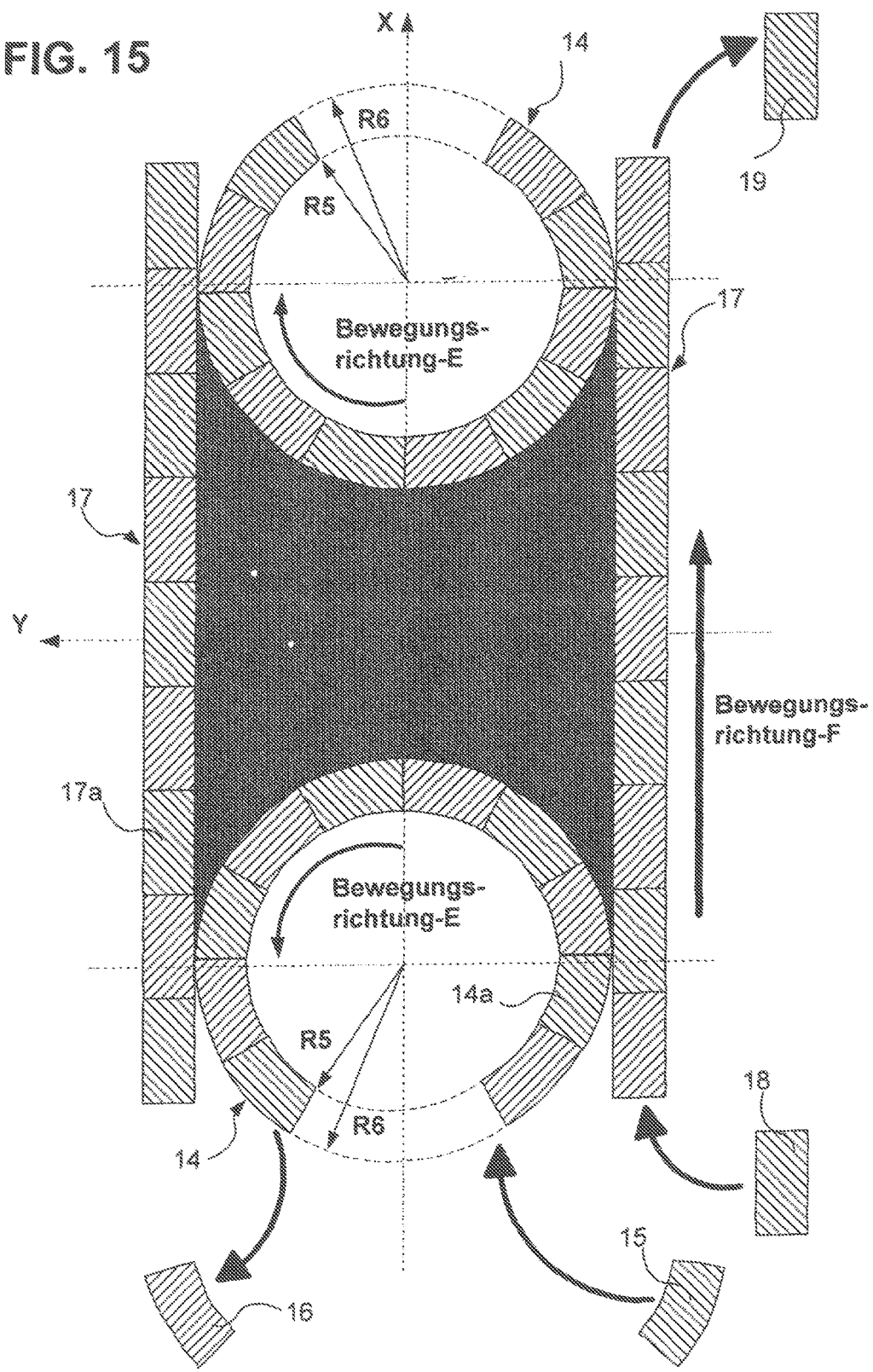

FIG. 14 shows, as a cross section in the Y-Z-plane, a possible design of melting furnace or a transport path of the melt (13) without a planar end walls delimited the furnace interior/melting space or the transport path, with representation of three surrounding surfaces of the melt (14) in cylindrical, thus vaulted form as partial hollow cylinders, the outer lateral surfaces of which are in contact with each other, whereby the radius centre points (R5, R6) are each outside the furnace interior/melting space of the melt (13), respectively, with indication of the direction of movement (E) of the respective surrounding surfaces of the melt (14) and exemplary representation of the addition of a new individual element at one of the surrounding surfaces of the melt (15) and exemplary representation of the removal of a worn out/used individual element at one of the surrounding surfaces of the melt (16), whereby it is also possible that the individual surrounding surfaces of the melt (14) in form of a partial hollow cylinder provide a gap or a plurality of gaps between the surrounding surfaces of the melt (14) or comprise one/more variably adjustable gaps in order for example enable a continuous or adjustable flow of melt/melting material as is desirable for the manufacturing of flat glass, for the controlled exhaust of exhaust gases or a controlled addition of raw material, as well as sinks in the exterior lateral surfaces of parts of the surrounding surfaces of the melt (14) in order to enable openings in the melting furnace or the transport path wherein at least two of the surrounding surfaces of the melt (14) are cylindrically while one of three surrounding surfaces of the melt (14) can be equally planar, such as for example a plain sidewall (17). FIG. 15 shows in a top view in the X-Y-plane a possible design of a melting furnace or a transport path of the melt (13) without planar covering faces delimiting the furnace interior/melting space, with representation of two planar sidewalls (17) with indication of the direction of movement (F) of both planar sidewalls (17) and exemplary representation of the addition of one individual element of the planar sidewall (18) at one of the two planar sidewalls (17) and exemplary representation of the removal of a worn out/used individual element of the planar sidewall (19) from one of the two planar sidewalls (17), and two surrounding surfaces of the melt (14) as end walls in cylindrical form, thus vaulted as partial hollow cylinders with indication of the direction of movement (E) of the two surrounding surfaces of the melt (14) as end walls with exemplary representation of the addition of a new individual element of the surrounding surface of the melt (15) at one of the two surrounding surfaces of the melt (14) as end wall and exemplary representation of the removal of worn/used individual element of the surrounding surfaces of the melt (16) at one of the two surrounding surfaces of the melt (14), wherein the two surrounding surfaces of the melt (14), which implement the end wall can also be turned with the rotational axis in the Y-plane wherein a rotation according to FIG. 15 in the Y-Z-plane is possible with a transport path of the melt (13).

Figure 16:
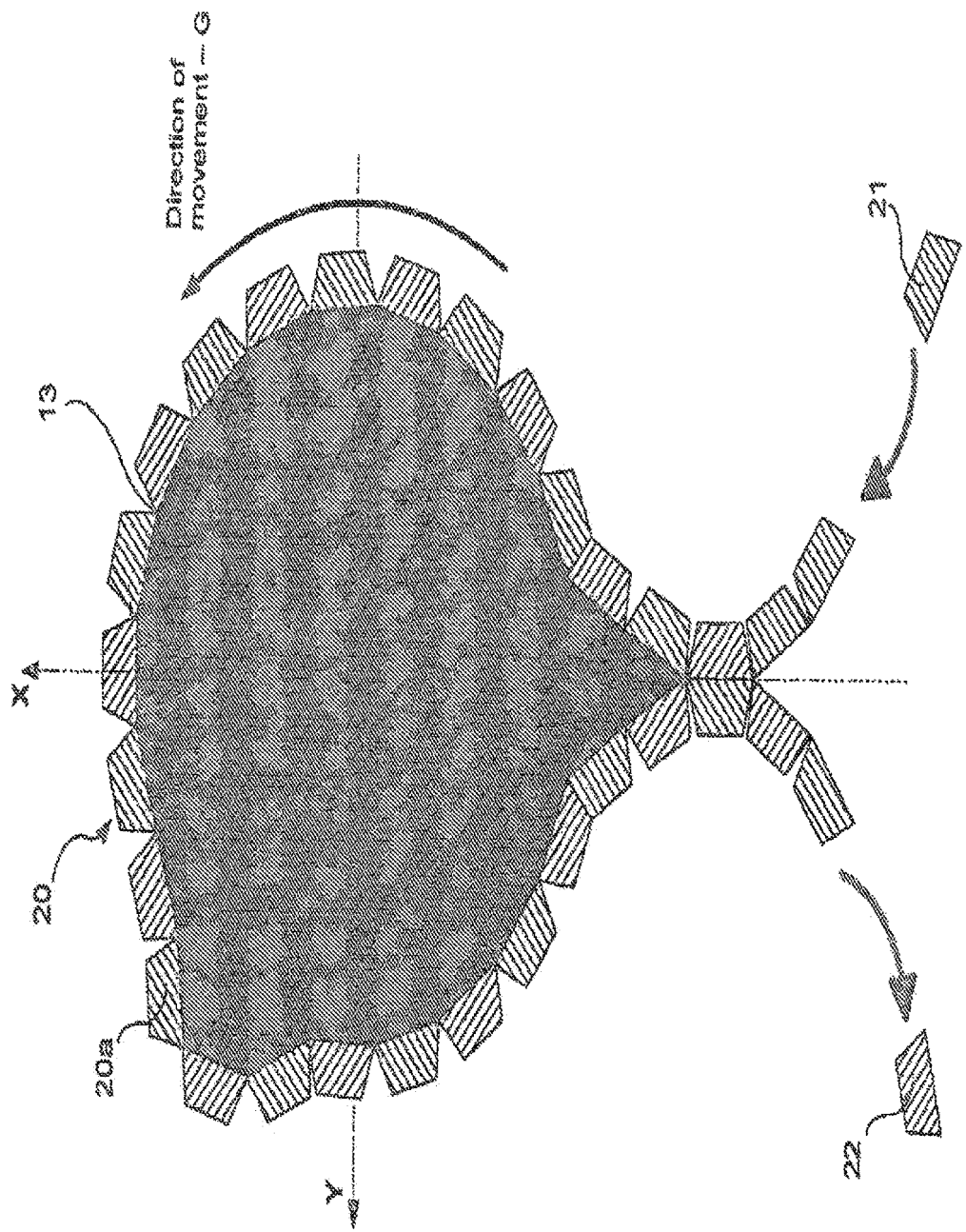
FIG. 16 a top view of a possible design of the melting furnace or of the transport path of the melt (13) without plain covering surfaces closing the furnace interior/melting space, with indication of the entire variable sidewall (20), in the X-Y-plane.

FIG. 16 shows in a top view in the X-Y-plane a possible design of a melting furnace or of a transport path of the melt (13) without planar covering faces delimiting the furnace interior/melting space with representation of the entire variable sidewall (20), with indication of the direction of movement (G) of the entire variable sidewall (20) and the presentation of the addition of a new individual element of the variable sidewall (21) and removal for worn out/used individual element of the variable sidewall (22) wherein the entire variable sidewall (20) can adapt any shape, as long as a secure delimitation by the planar, not-shown covering phases can be achieved.

Figure 17:
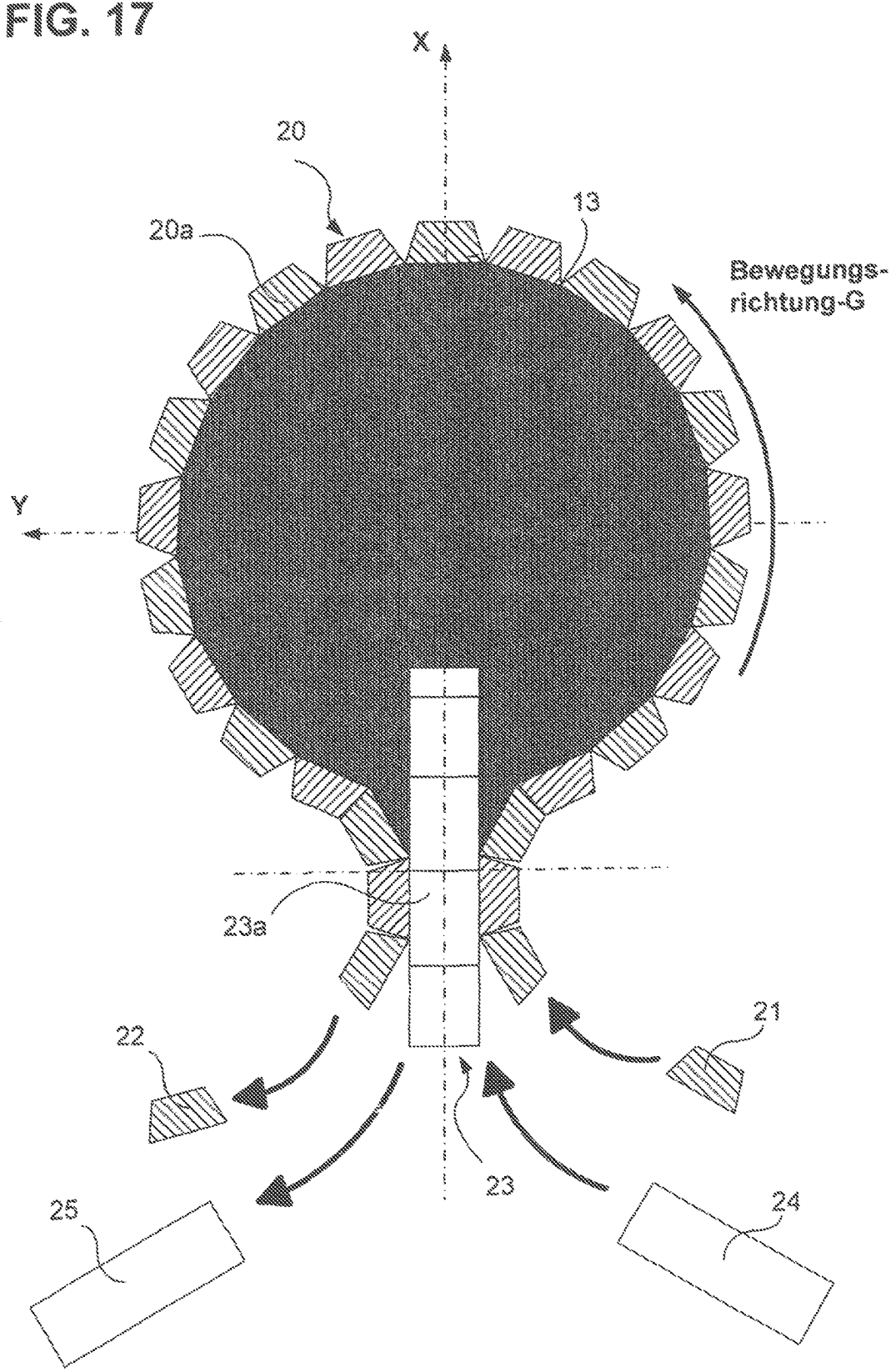
FIG. 17 top view of a possible design of the melting furnace or of the transport path of the melt (13) without the plain covering surfaces closing the furnace interior/melting space, with indication of the entire variable sidewall (20) and inserted body of revolution (23), in the X-Y-plane.

FIG. 17 shows in a top view in the X-Y-plane a possible design of a melting furnace or a transport path of the melt (13) without planar covering faces delimiting the furnace interior/melting room in the same way as in FIG. 16 but with an inserted body of revolution (23) with rotational axis in the Y-plane and representation of the addition of a new individual element of the body of revolution (24) and removal of a worn/used individual element of the body of revolution (25).

The respective surrounding surfaces of the melt (14) in the illustrative exemplary designs of the melting furnace or the transport path of the melt (13) do not necessarily have the same radii (R5, R6).

All described component subassemblies (1, 4, 7, 10, 14, 17, 20, 23) can also be made from one exchangeable part.

The melting furnace and the transport path can have any adequate and technically reasonable shape.

REFERENCE LIST 1 bottom/base plate of the melting furnace
1a. individual element of the bottom (1) of the melting furnace
2 addition of a new individual element of the bottom (1a) of the melting furnace
3 removal of a worn out/used individual element of the bottom (1a) of the melting furnace
4 end wall at the side of raw material feeding of the melting furnace
4a. individual element at the end wall at the side of raw material feeding (4) of the melting furnace
5 addition of a new individual element at the end wall at side of raw material feeding (4a) of the melting furnace
6 removal of a worn out/used individual element at the side of raw material feeding (4a) of the melting furnace
7 end wall at the side of the melt outlet of the melting furnace
7a. individual element of the end wall at the side of the melt outlet (7) of the melting furnace
8 addition of a new individual element of the end wall at the side of the melt outlet (7a) of the melting furnace
9 removal of a worn out/used individual element at the end wall at the side of the melt outlet (7a) of the melting furnace
10 entire sidewall with vault of the melting furnace 10.1 to 10.n arc segment of the entire sidewall with vault (10) of the melting furnace
10.1a. individual sidewall element of the melting furnace
10.1b. individual nozzle brick element of the melting furnace
10.1c. individual vault element of the melting furnace
11 addition of a new arc segment of the sidewall with vault (10.1 to 10.n) of the melting furnace
12 removal of worn out/used arc segment of sidewall with vault (10.1 to 10.n) of the melting furnace
13 melt
14 surrounding surface of the melt in form of a partial hollow cylinder of the melting furnace or of the transport path
14a. individual element of the surrounding surface of the melt (14) in form of a partial hollow cylinder of the melting furnace or of the transport path
15 addition of a new individual element of the surrounding surface of the melt (14a) of the melting furnace or of the transport path 16 removal of a worn out/used individual element of the surrounding surface of the melt (14a) of the melting furnace or the transport path
17 planar sidewall of the melting furnace/transport path
17a. individual element of the planar sidewall (17) of the melting furnace or of the transport path
18 addition of a new individual element of the planar sidewall (17a) of the melting furnace/transport path
19 removal of a worn out/used individual element of the planar sidewall (17a) of the melting furnace or of the transport path
20 entire variable sidewall of the melting furnace or of the transport path
20a. individual element of the variable sidewall (20) in the form of a regular straight prism of the melting furnace or transport path
21 addition of a new individual element of the variable sidewall (20a) of the melting furnace or of the transport path
22 removal of a worn out/used individual element of the variable sidewall (20a) of the melting furnace or of the transport path
23 body of revolution with a rotational axis in the Y-plane
23a. individual element of the body of revolution (23)
24 addition of an individual element of the body of revolution (23)
25 removal of a worn out/used individual element of the body of revolution (23)
A. direction of movement of the bottom (1)
B. direction of movement of the end wall at the side of raw material feeding (4)
C. direction of movement of the end wall at the side of the melt outlet (7)
D. direction of movement of the entire sidewall with vault (10)
E. direction of movement of a surrounding surface of the melt (14)
F. direction of movement of a planar sidewall (17)
G. direction of movement of a variable sidewall (20)
h. distance between the X-axis and the plane of the bottom (1) of the plane of the bottom (1) directed towards the furnace interior/melting space
R1 inner radius of the arc segment of the sidewall with vault (10.1)
R2 outer radius of the arc segment of the sidewall with vault (10.1)
R3 inner radius of the ground plate (1)
R4 outer radius of the ground plate (1)
R5 inner radius of a surrounding surface of the melt (14)
R6 outer radius of the surrounding surface of the melt (14)
X. X-axis of the orthogonal Cartesian coordinate system
Y. Y-axis of the orthogonal Cartesian coordinate system
Z. Z-axis of the orthogonal Cartesian coordinate system

What is claimed is:

1. A method for exchanging at least one replaceable element of a melting furnace while the melting furnace is performing a melt process, the method comprising:
   providing a furnace including a melting space and a wall, the melting space being at least partially defined by the wall, and the wall comprising a plurality of replaceable elements, the wall including a leading edge, a trailing edge, and a middle section between the leading edge and the trailing edge,
   moving the wall in a direction from the trailing edge to the leading edge and relative to the melting space such that the middle section contacts the melting space, and such that the leading edge and the trailing edge do not contact the melting space,
   removing a first replaceable element from the leading edge, and
   adding a second replaceable element to the wall at the trailing edge;
   wherein the moving step, removing step, and adding step are performed while the melting furnace is performing the melt process and without interrupting the melt process in the melting furnace.

2. The method of claim 1, wherein:
   the wall comprises a partial hollow cylinder;
   the wall is moved in the direction from the trailing edge to the leading edge by rotating the wall about a longitudinal axis of the partial hollow cylinder;
   a first row of replaceable elements including the first replaceable element is removed from the wall at the leading edge; and
   a second row of replaceable elements including the second replaceable element is added to the wall at the trailing edge.

3. The method of claim 2, wherein the wall is moved as a function of an amount of wear to the wall that occurs in a radial direction from the longitudinal axis as a result of the wall contacting a melted material in the melting space.

4. A method for exchanging at least one element of a melting furnace while the melting furnace is performing a melt process, comprising:
   moving a first element of the melting furnace that is not in contact with a melting space of the melting furnace toward the melting space,
   adding a second element to a first free end of the melting furnace that is not in contact with the melting space by connecting the second element to the first element before the first element is contacting the melting space, and
   removing a third element from a second free end of the melting furnace that is not in contact with the melting space after the third element has contacted the melting space,
   wherein the second element is added and the third element is removed while the melting furnace is performing the melt process and without interruption of the melt process in the melting furnace.

5. The method of claim 4, wherein at least one of the first, second, and third elements is exchangeable and interchangeable.

6. The method of claim 4, wherein at least one of the individual first, second, and third elements is translationally moveable, rotationally turnable, or both with respect to the melting space.

7. The method of claim 4, wherein at least one of the first, second, and third elements is at least one of variably movable and variably turnable.

8. The method of claim 4, wherein at least one of the first, second, and third elements is moveable out of a plane of the other of the first, second, and third elements.

9. The method of claim 4, wherein:
   the first, second, and third elements are part of a wall of the melting furnace that includes a plurality of elements,
   the wall comprises a partial hollow cylinder;
   the first element is moved toward the melting space by rotating the wall about a longitudinal axis of the partial hollow cylinder;

a first row of elements including the second element is added to the wall at the first free end; and a second row of replaceable elements including the third element is removed from the wall at the second free end.

10. The method of claim 9, wherein the wall is moved as a function of an amount of wear to the wall that occurs in a radial direction from the longitudinal axis as a result of the wall contacting a melted material in the melting space.

11. A melting furnace comprising:

a melting space in which the melting furnace performs a melt process, and a plurality of individual elements defining a wall of the melting furnace, wherein at least a portion of the wall contacts the melting space, wherein the individual elements are aligned with respect to each other or are adjacently arranged, wherein the wall is movable in a moving direction relative to the melting space while the melting furnace performs the melt process and without interrupting the melt process, wherein before the wall is moved in the moving direction during the melt process, individual elements at a first end of the wall do not contact the melting space and are configured to connect to individual replacement elements, and individual elements at a second end of the wall contact the melting space, wherein after the wall is moved in the moving direction during the melt process, the individual elements at the first end of the wall contact the melting space, and the individual elements at the second end of the wall do not contact the melting space and are configured to disconnect from the wall, wherein the individual elements of the wall are replaceable without interruption of the melt process in the melting furnace.

12. The melting furnace of claim 11, wherein the wall is a planar wall of the melting furnace.

13. The melting furnace of claim 11, wherein the wall is a cylinder segment of the melting furnace.

14. The melting furnace of claim 11, wherein at least one of the plurality of individual elements is configured to be moved out of a plane of the other of the plurality of individual elements.

15. The melting furnace of claim 11, wherein:
the wall comprises a partial hollow cylinder;
the wall is moved in the moving direction by rotating the wall about a longitudinal axis of the partial hollow cylinder;

a first row of the individual elements at the first end are configured to connect to a second row of individual replacement elements is removed from the wall at the first end; and a third row of the individual elements at the second end are configured to disconnect from the wall at the second end.

16. The melting furnace of claim 15, wherein the wall is moved as a function of an amount of wear to the wall that occurs in a radial direction from the longitudinal axis as a result of the wall contacting a melted material in the melting space.

17. A method for exchanging at least one element of a melting furnace while the melting furnace is performing a melt process, the method comprising:

moving a first element of the melting furnace in a first direction toward a melting space of the melting furnace while the melting furnace is performing the melt process, before moving the first element in the first direction and before the first element contacts the melting space, adding a second element to the first element at a first end of the melting furnace, and after moving the first element in the first direction, removing a third element from a second end of the melting furnace that is not contacting the melting space, the second end being opposite from the first end, wherein after the third element is removed from the second end of the melting furnace, the third element is not placed in contact with the melting space so as to avoid introducing impurities into the melting space, and wherein the second element is added and the third element is removed during the melt process and without interruption of the melt process in the melting furnace.

18. The method of claim 17, wherein:
the first, second, and third elements are part of a wall of the melting furnace that includes a plurality of elements,
the wall comprises a partial hollow cylinder;
the first element is moved in the first direction by rotating the wall about a longitudinal axis of the partial hollow cylinder;
a first row of elements including the second element is added to the wall at the first end; and
a second row of elements including the third element is removed from the wall at the second end.

19. The method of claim 18, wherein the wall is moved as a function of an amount of wear to the wall that occurs in a radial direction from the longitudinal axis as a result of the wall contacting a melted material in the melting space.

* * * * *